US007664929B2

(12) United States Patent
Pinto et al.

(10) Patent No.: US 7,664,929 B2
(45) Date of Patent: Feb. 16, 2010

(54) DATA PROCESSING APPARATUS WITH PARALLEL OPERATING FUNCTIONAL UNITS

(75) Inventors: Carlos Antonio Alba Pinto, Eindhoven (NL); Ramanathan Sethuraman, Bangalore (IN); Srinivasan Balakrishnan, Bangalore (IN); Harm Johannes Antonius Maria Peters, Waalare (NL); Rafael Peset Llopis, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 301 days.

(21) Appl. No.: 10/530,375

(22) PCT Filed: Sep. 17, 2003

(86) PCT No.: PCT/IB03/04184

§ 371 (c)(1),
(2), (4) Date: Apr. 6, 2005

(87) PCT Pub. No.: WO2004/034252

PCT Pub. Date: Apr. 22, 2004

(65) Prior Publication Data
US 2005/0273569 A1 Dec. 8, 2005

(30) Foreign Application Priority Data
Oct. 11, 2002 (EP) .................................. 02079221

(51) Int. Cl.
*G06F 9/38* (2006.01)

(52) U.S. Cl. .......................... 712/24; 711/100; 711/200; 711/202; 711/219; 711/220; 712/206; 712/214; 712/215

(58) Field of Classification Search ...................... None
See application file for complete search history.

(56) References Cited

U.S. PATENT DOCUMENTS

| 5,208,781 | A | * | 5/1993 | Matsushima | ........... 365/230.01 |
| 5,875,483 | A | * | 2/1999 | Tremblay | ................... 711/210 |
| 6,076,159 | A | * | 6/2000 | Fleck et al. | ................. 712/241 |
| 7,024,538 | B2 | * | 4/2006 | Schlansker | ................... 712/24 |
| 2003/0145116 | A1 | * | 7/2003 | Moroney et al. | ............ 709/249 |

FOREIGN PATENT DOCUMENTS

EP 0473420 A2 3/1992

\* cited by examiner

*Primary Examiner*—Christian P Chace
*Assistant Examiner*—Alan M Otto

(57) ABSTRACT

A program of instruction words is executed with a VLIW data processing apparatus. The apparatus comprises a plurality of functional units capable of executing a plurality of instructions from each instruction word in parallel. The instructions from each of at least some of the instruction words are fetched from respective memory units in parallel, addressed with an instruction address that is common for the functional units. Translation of the instruction address into a physical address can be modified for one or more particular ones of the memory units. Modification is controlled by modification update instructions in the program. Thus, it can be selected dependent on program execution which instructions from the memory units will be combined into the instruction word in response to the instruction address.

16 Claims, 3 Drawing Sheets

DATA PROCESSING APPARATUS WITH PARALLEL OPERATING FUNCTIONAL UNITS

The invention relates to a data processing apparatus, such as a VLIW (Very Long Instruction Word) processor, that is capable of executing a plurality of instructions from an instruction word in parallel.

A VLIW processor makes it possible to execute programs with a high degree of instruction parallelism. Conventionally, in each instruction cycle the VLIW processor uses a program counter to fetch an instruction word that contains a fixed number, greater than one, of instructions (often called operations). The VLIW processor executes these operations in parallel in the same instruction cycle (or cycles).

For this purpose the VLIW processor contains a plurality of functional units, each capable of executing one of the operations from the instruction word at a time. Different kinds of functional units are typically provided, such as ALU's (arithmetic logics units), multipliers, branch control units, memory access units etc. Often dedicated purpose functional units are also included, designed to speed up programs for a particular applications. Thus, for example, functional units for performing parts of MPEG encoding or decoding may be added. In advanced VLIW processors hundreds of functional units may be present. In principle, the instruction word must contain instructions for all of these functional units in parallel.

As the abbreviation VLIW indicates this leads to very wide instruction words. As a result a considerable amount of instruction memory is needed to store programs of such instructions, especially when the programs executed by the VLIW processor contain many instructions. This leads to increased costs.

Several measures have been proposed to reduce these costs. For example, the functional units have been organized into groups of one or more functional unit, so that the instruction word provides one instruction per group. This limits the amount of instructions that has to be included in the instruction word (when at least some of the groups contain more than one functional unit) and thereby it reduces instruction memory size, without reducing the number of functional units that can receive instructions. However, such a grouping reduces the number of functional units that can execute instructions in parallel. Thus, there is always a direct trade-off between the amount of parallelism and memory size.

More generally, the inflexibility with which instructions have to be combined into instruction words in VLIW instructions also increases the size of the memory used by programs. For example, when a program must support alternative execution of different combinations of instructions in an instruction cycle, instruction words for all possible combinations have to be stored. When one part of the functional units must execute the same loop of instructions repeatedly a number of times while other functional execute progressively different instructions, conventional VLIW processors only have the option of choosing between unrolling the loop, i.e. enlarging the program by combining repeated copies of the instructions of the loop with progressively different instructions, or executing the loop and the progressive instructions in different instruction cycles. The former greatly increases the required instruction memory size and is not possible if the number of iterations in the loop is not known in advance. The latter reduces the amount of parallelism and thereby increases execution time.

Among others, it is an object of the invention to increase the flexibility with which instructions can be combined in instruction words of VLIW processors.

Among others, it is another object of the invention to reduce the amount of instruction memory needed in VLIW processors.

The invention provides for a data processing apparatus. This data processing apparatus is of a type, such as a VLIW processor, that uses a central control of program flow with an instruction address that addresses an instruction word that contains a plurality of instructions for different functional units. However, during program execution the translation of the instruction address into physical addresses can be modified selectively for a particular one of the functional units or a group of the functional units individually.

This can be used to change the way instruction words are composed from instructions from different memory units during program execution. Thus, when part of a first VLIW instruction word in a program is a copy of part of a second VLIW instruction word in that program, it is not necessary to provide complete storage locations for both words. Instead, a modification of the address translation between supplying the instruction address for the first instruction word and supplying the instruction address for the second instruction word makes it possible to re-use the stored part of the first instruction word in the second instruction word. Thus, less memory is needed to store a program. This may be applied to implement loops wherein part of the functional units have to execute a loop body repeatedly while other functional units execute progressive instructions, or to implement "If-then-else" constructs, wherein part of the functional units conditionally execute alternative while other functional units execute the same instructions irrespective of the condition.

Preferably, the modification of address translation is controlled by modification update instructions that are part of the instructions of the program. The modification update instructions may be contained in the instructions from the particular one of the memory units, or in instructions from one or more memory units other than the particular one of the memory units. Thus, a flexible control over looping and conditional execution can be realized. However, without deviating from the invention control of the modification of translation may be realized outside the program, for example using one or more memory management units that provide for translation of instruction addresses that may differ for different memory units, so that the same instruction address can be translated differently for different memory units, with the possibility of translating different instruction addresses each to the same physical address for one memory unit that supplies one part of the instruction word and to different instruction addresses for other memory units that supply other parts of the instruction word. This is particularly useful for implementing loops of instructions that have to be supplied repeatedly a predetermined number of times by only part of the memory units.

In a further embodiment, at least the particular one of the memory units has memory locations only for an address range that is smaller than a range of addresses for which another one of the memory units has locations available. When the instruction address leads to addresses outside this range, the functional unit(s) that gets its instructions from the particular one of the memory units may be deactivated, for example by supplying default No-op instructions, or disabling the functional unit(s). When deactivated the functional unit is preferably switched to a power saving state, for example by disabling clock signals in the functional unit.

The data processing apparatus can be used to execute a program that involves executing a loop for some of the functional units during instruction cycles when other functional units execute progressive instructions. Each time when a loop back occurs, the translation of the instruction address for the functional units that are involved in the loop is modified so that the instructions from the loop are fetched repeatedly from the same locations.

The translation of the common instruction address into memory addresses may be changed for more than one functional unit or group of functional units. Thus multiple loops with mutually different numbers of instruction may be executed in parallel.

These and other advantageous aspects of the data processing apparatus and method according to the invention will be described in more detail using the following figures.

Figure 1:
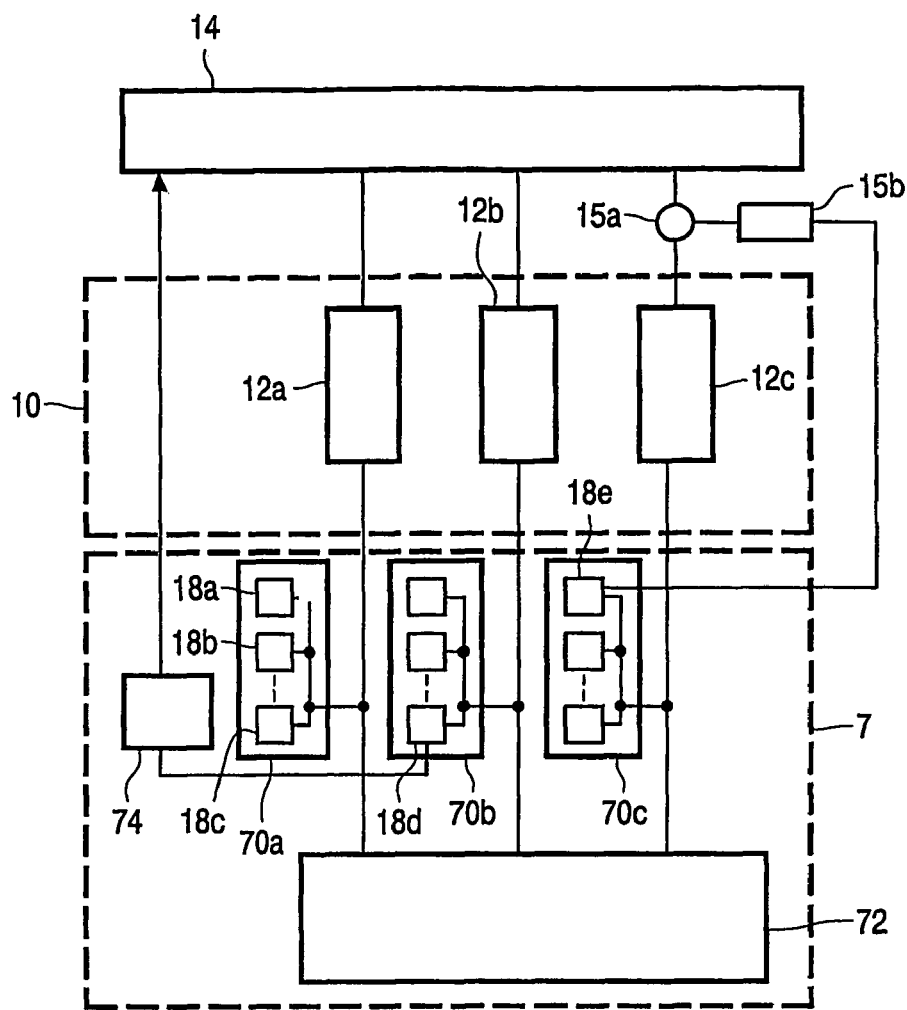
FIG. 1 shows a data processing apparatus

FIG. 1 shows a processing apparatus that contains a memory system 10, with memory units 12a-c, a controller 14, and an instruction execution unit 7 that contains groups 70a-c of functional units 18a-e, a register file 72, an instruction address counter unit 74 an offset adder 15a and an offset register 15b. Instruction address counter unit 74 has an instruction address output coupled to controller 14. Controller 14 has address outputs coupled to respective memory units 12a-c. One of the address outputs is coupled to memory unit 12c via offset adder 15a. Memory units 12a-c have instruction outputs coupled to respective ones of groups 70a-c and to register file 72. Register file has operand/result output/input ports (not shown separately) coupled to groups 70a-c. Groups 70a-c each contain one or more functional unit 18a-e, which all have operation code inputs coupled to memory units 12a-c, operand inputs coupled to register file 72 and result outputs coupled to register file 72 (all being symbolized by a single connection between memory units 12a-c, groups 70a-c of functional units 18a-e and the register file 72.). One of groups 70b has a branch address output coupled to instruction address counter unit 74. Another one of the groups 70c has an offset adjust output coupled to offset register 15b, which in turn has an offset output coupled to offset adder 15a.

In operation the processing apparatus operates in successive instruction cycles, in which address counter unit 74 outputs addresses of successive instructions to controller 14 (these instructions will be called "successive" because the corresponding instructions are executed successively, although in the case of branches the addresses may not be successive). Controller outputs further instruction addresses derived from the instruction address to memory units 12a-c. One of the further instruction addresses is modified by offset adder 15a, which adds an offset from offset register 15b to the further instruction address. The (modified) further instruction addresses address instruction memory locations in memory units 12a-c. Memory units 12a-c output addressed instructions to instruction execution unit 7.

The combination of instructions output from memory units 12a-c forms an instruction word with fields for the various instructions. Each group 70a-c of functional units 18a-e receives an instruction from a respective one of memory units 12a-c. The functional units 18a-e of the group 70a-c determine which of the functional units 18a-e of the group 70a-c should execute the instruction from the corresponding memory unit 12a-c, and that functional unit reads operands addressed by the instruction from register file 72 (if any) and supplies results to register file 72 (if any).

As shown, one of the groups 70a-c has a connection from a branch functional unit 18d to update the instruction address in instruction address counter unit 74 in response to an instruction. Branch functional unit 18d executes this update for example when it determines that some condition has been met. Updates may be absolute (replacement of program counter value in address counter unit 74) or relative (addition to the program counter value). A single connection is shown by way of example. In practice more than one group 70a-c may contain one or more branch functional units coupled to instruction address counter unit 74.

Updates of the program counter (instruction address) in address counter unit 74 by branch functional unit 18d affect program (instruction address) flow for all groups of functional units 70a-c. Offset adder 15a and offset register 15b provide for a way of affecting program (instruction address) flow for one of the groups of functional units 70c individually. For this purpose, a group 70c contains a local branch functional unit 18e, which processes local branch instructions basically in the same way as a conventional branch functional unit 18d, except that local branch functional unit 18e does not update the program counter value in the overall address counter unit. Instead local branch functional unit 18e updates an offset value in offset register 15b, which is used to modify the address supplied to the memory unit 12a-c of one of the groups of functional units 70a-c. Thus, the offset can be altered during program execution dependent on conditions that occur during execution.

Figure 2:
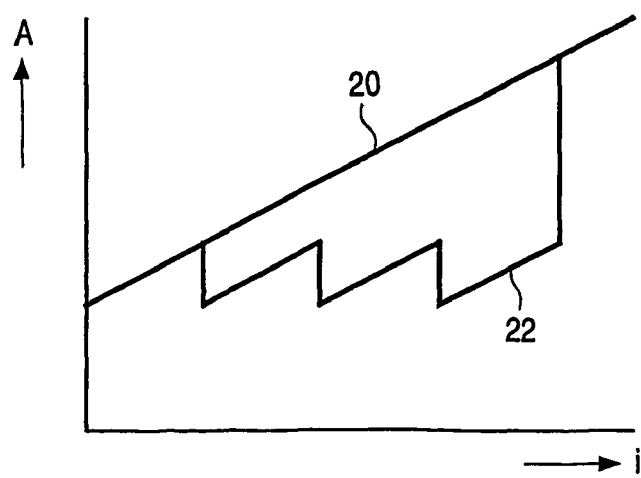
FIG. 2 illustrates execution of a loop of instructions

FIG. 2 illustrates how this may be used for executing a loop of instructions repeatedly with one group of functional units 70c, while the other groups of functional units 70a,b execute progressive instructions. In this figure instruction address values A are plotted vertically and instruction cycle number, representative of time is plotted horizontally. A first line 20 illustrates the progressive instruction address from program counter unit 74 that are successively supplied to part of memory units 12a,b a second line illustrate looping addresses 22 that are successively supplied to one of the memory units 12c in parallel with the progressive addresses.

In this case, one memory unit 12c contains the instructions from the loop and other memory units 12a-b contain the progressive instructions. Initially, the offset value in offset register 15b is for example zero and all memory units 12a-c receive the same address. At the end of the loop one memory unit 12c outputs a branch instruction for local branch functional unit 18e, which in response subtracts an offset value from the offset in offset register 15b. The offset equals the offset between the start of the loop and the branch instruction. As a result, although the program counter value in program counter unit 74 continues to increase, one of the memory units 12c starts to repeat fetching of instructions from the start of the loop. Once the instructions from the loop have been executed a sufficient number of times local branch functional unit 18e does not cause the offset value to be subtracted. Instead, implicitly with the absence of branch back, or in response to a subsequent instruction local branch functional unit 18e may reset the offset in offset register 15b to zero or to some other appropriate value.

The invention is not limited to loops, however. For example, "if-then-else" constructs for part of the functional units may be supported, by updating the offset value in offset register 15b dependent on whether the "then"-clause or the "else"-clause must be executed. Similar techniques may be applied to "switch by case" constructs.

As shown in FIG. 2, the instruction addresses from program counter unit 74 progress uniformly. Of course, branches may cause deviations from this uniform progression. Preferably, therefore, a compiler that generates the instructions words for execution by the processing apparatus prevents overall branch instructions (in particular conditional branch instructions) during parts of the program where it is required that one group of functional units executes instructions from addresses with a selectable offset from the overall program counter. In an embodiment the compiler that generates the instructions for execution by the processing apparatus adds offset changing instructions only after checking that no such program counter branches occur in the part of the program where the offset is applied, or conversely, avoids program counter branch instructions in parts of the program where an offset is applied (This may be implemented for example using so-called "if-conversion", that is, by implementing an "if then I1 else I2" construct by including and executing in the program both the instructions I1 that have to be executed in the "then case" and those instructions I2 that have to be executed in the "else case" (if any) and making completion of execution of each of these instructions I1, I2 conditional on some guard bit value that has been computed from the "if" condition).

However, the compiler may also insert corresponding local branches to update the offset so that it undoes the effect of branches of the overall program counter value. Thus, a branching or looping behavior of the instruction addresses from program counter unit 74 can be combined with a steady progression of local addresses applied to one of memory units 12a-c.

Although it has been assumed in this explanation that controller 14 supplies the same addresses to all memory units 12a-c, this is not in fact necessary. Without deviating from the invention controller 14 may apply different forms of mapping. Similarly, although local branch functional unit 18e has been shown in the group of functional units 70a-c whose instruction address is modified, it should be understood that without deviating from the invention local branch functional unit 18e may be located in any group of functional units 70c. Furthermore, although only one local branch functional unit 18e has been shown for one memory unit 12c it should be understood that more than one local branch unit may be provided for modifying the offset for the same memory unit 12c, e.g. for modifying the offset in offset register 15b or in a plurality of offset registers.

Figure 3:
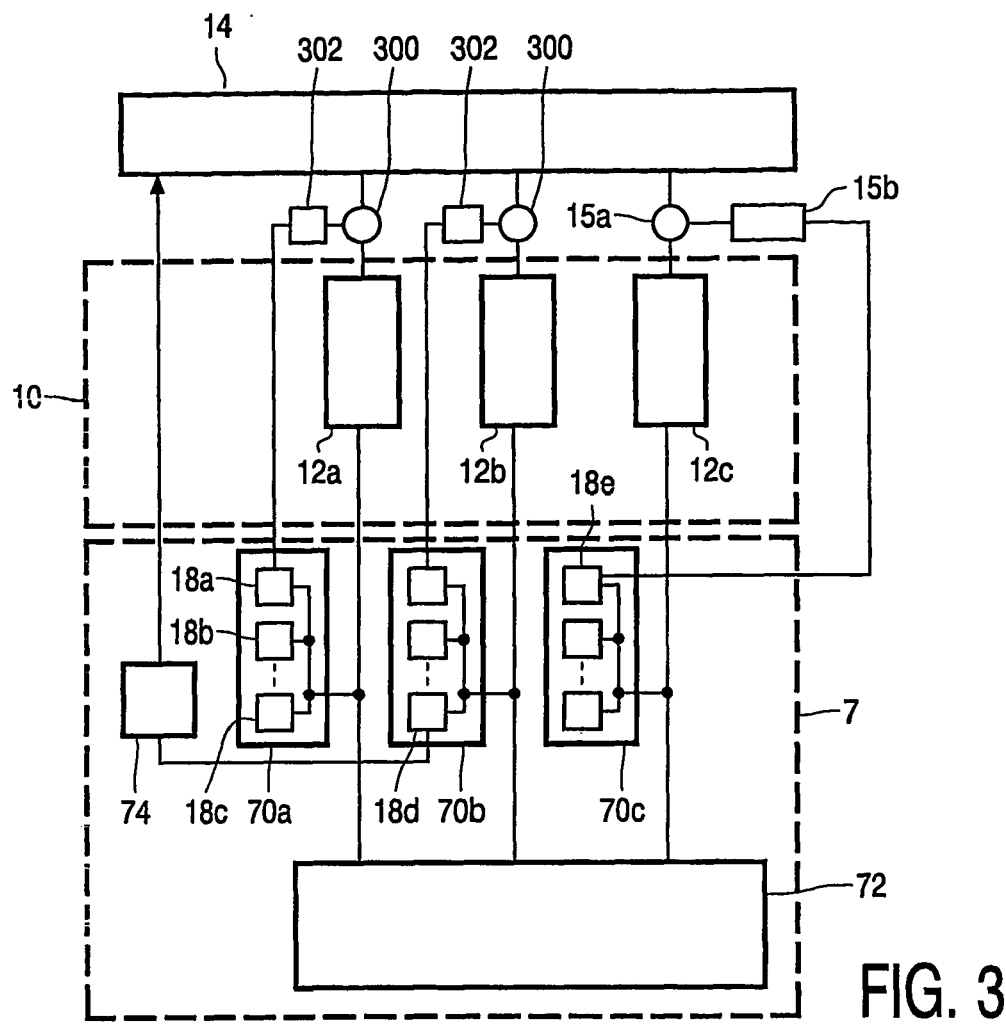
FIG. 3 shows a data processing apparatus

FIG. 3 shows a data processing apparatus in which circuits 300 for the modification of the addresses are provided for more than one of the memory units 12a-c. Without deviating from the invention, such circuits may also be provided only for a subset of one ore more memory units 12a-c. As shown, the offset provided by each of these circuits is controlled by a respective local branch functional unit 18e. However, without deviating from the invention or the local branch unit 18e may be constructed to execute instructions that select for which memory unit 12a-c the offset should be modified. Also a shared address modification circuit may be used for a plurality of the memory units 12a-c.

Figure 4:
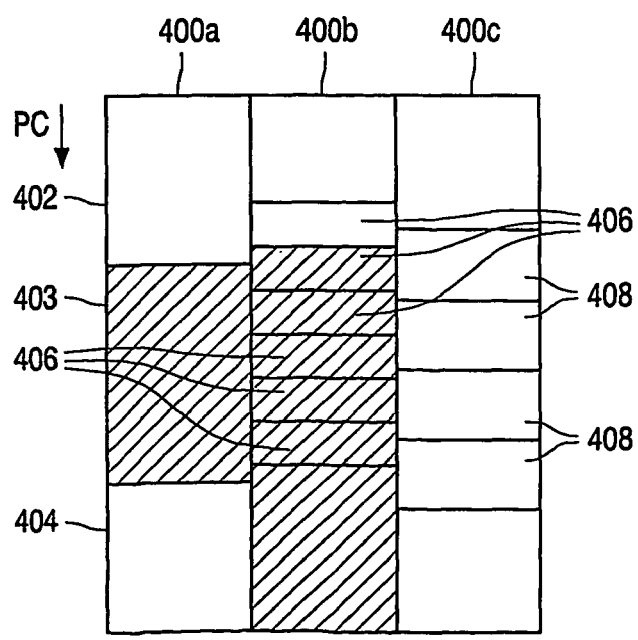
FIG. 4 illustrates an example of program flow

FIG. 4 illustrates an example of program flow where one group of functional units executes progressive instructions and other groups of functional units execute repetitions of respective loop bodies, preceded and followed by execution of progressive instructions. During execution a program counter value PC steadily increases from top to bottom in the figure. Instruction execution for respective ones of the groups of functional units is indicated in respective columns 400a-c. First column 400a shows a first and second blocks 402, 404 of successively executed instructions. Second and third column 400b,c show repeated execution of blocks 406, 408. Because of data dependencies repeated execution of blocks 406, 408 can start only after execution of a certain instruction in first block 402, whereas execution of second block 404 can start only after a certain instruction in repeatedly executed block 408 has been executed for the last time. Between execution of the last instruction of first block 402 and the start of execution of the first instruction second block 404 first column contains an intermediate block 403 wherein only No-Ops may be executed.

According to the invention, this type of execution is realized by updating the offset for the functional units that execute repeatedly executed blocks 406, 408 each time when starting execution of a new repetition of the relevant block. Thus, the instruction address locations that contain the instructions from blocks 406, 408 are repeatedly addressed, although overall the program counter PC value steadily increases.

During execution of intermediate block 403 the group of functional units that execute instructions from first column 400a may receive no-ops from successively higher locations in its corresponding instruction memory unit. Thus, a number of No-ops should be provided in that instruction memory unit that corresponds repeated execution of instructions from blocks 406, 408 in the other functional units. Alternatively, the offset for the instruction memory with instructions of first column 400a may also be periodically updated so as to provide for repeated "execution" of a body of No-ops, or loop back instructions in intermediate block 403. Thus, memory space is saved. Preferably this body should be as short as possible and it should be repeated as many times as possible in intermediate block 403 to fill this block as much as possible with repeated executions.

When the apparatus is arranged to permit updates of the offset registers of groups of functional units that execute instructions from the second or third column 400b,c by instructions from the group of functional units that executes instructions from first column 400a, the first column 400a (including intermediate block 403) may include instructions that cause repeated execution of block 406 and/or block 408. Otherwise, these instructions may be included in those blocks.

When the invention is used it is not necessary that the address ranges of memory units 12a-c are co-extensive: memory units 12a-c may contain mutually different numbers of addressable locations. Thus, for example, a first one of the memory units 12a-c that contains parts of instruction words that are intended for a group of functional units 70a that performs a set of general purpose instructions, including branches and ALU (Arithmetic Logic Unit) instructions, may provide for a greater number of instruction addresses than memory units 12a-c that apply instructions to other, more specialized, groups of functional units. In this case, the general purpose functional units may generally be active to execute instructions during execution of a program, whereas the more specialized functional units addresses may be active only intermittently during execution of a program, or they may repeatedly execute a loop of instructions while the general purpose functional units execute progressively different instructions.

When a group of functional units 70a-c does not need to execute instructions, the offset used to execute the memory address for the memory unit 12a-c of that group may be repeatedly updated so as to limit the range of addresses applied to that memory unit, so that the addresses stay in range for that memory unit 12a-c. However, preferably, the relevant memory unit 12a-c is at least partly disabled when its group of functional units 70a-c does not need to execute instructions during a part of a program. Thus, power dissipation can be reduced. In this case, the instruction addresses may run on, through a range of address values for which the relevant memory unit 12a-c does not store instructions.

The invention is not limited to repeated execution of loops of instructions. For example, programs that contain if-thenelse clauses which affect only part of the groups of functional units 70*a-c* (the other groups executing the same instructions both in case of the "then" clause and in case of the "else" clause) may also use the invention. In this case the offset the memory unit 12*a-c* of a selected group 70*a-c* may be updated dependent on the "if" condition, at a time when the instruction address for the other groups of functional units runs on. Thus, no extra instructions have to be provided for these other functional units.

Although all groups of functional units 70*a-c* have been shown without distinctions, it will be understood that the groups may in fact differ: functional units in some groups may receive literal data, such as branch addresses or constants from memory units 12*a-c*, whereas others merely receive operation codes, data being supplied from register file 72, some groups may receive larger numbers of operands than others, or produce larger numbers of results.

Furthermore, although separate memory units 12*a-c* have been shown for respective groups of functional units 70*a-c*, it will be understood that some groups may share a memory unit 12*a-c*, so that the memory unit produces instructions for these groups in parallel (in general these memory units will have wider instruction output than other ones of memory units 12*a-c*).

Also, although an offset register has been shown as a simple way to implement address modification, it will be understood that, without deviating from the invention, other ways may be used to translate addresses for part of the memory units 12*a-c* that supply instructions from the instruction word.

Figure 5:
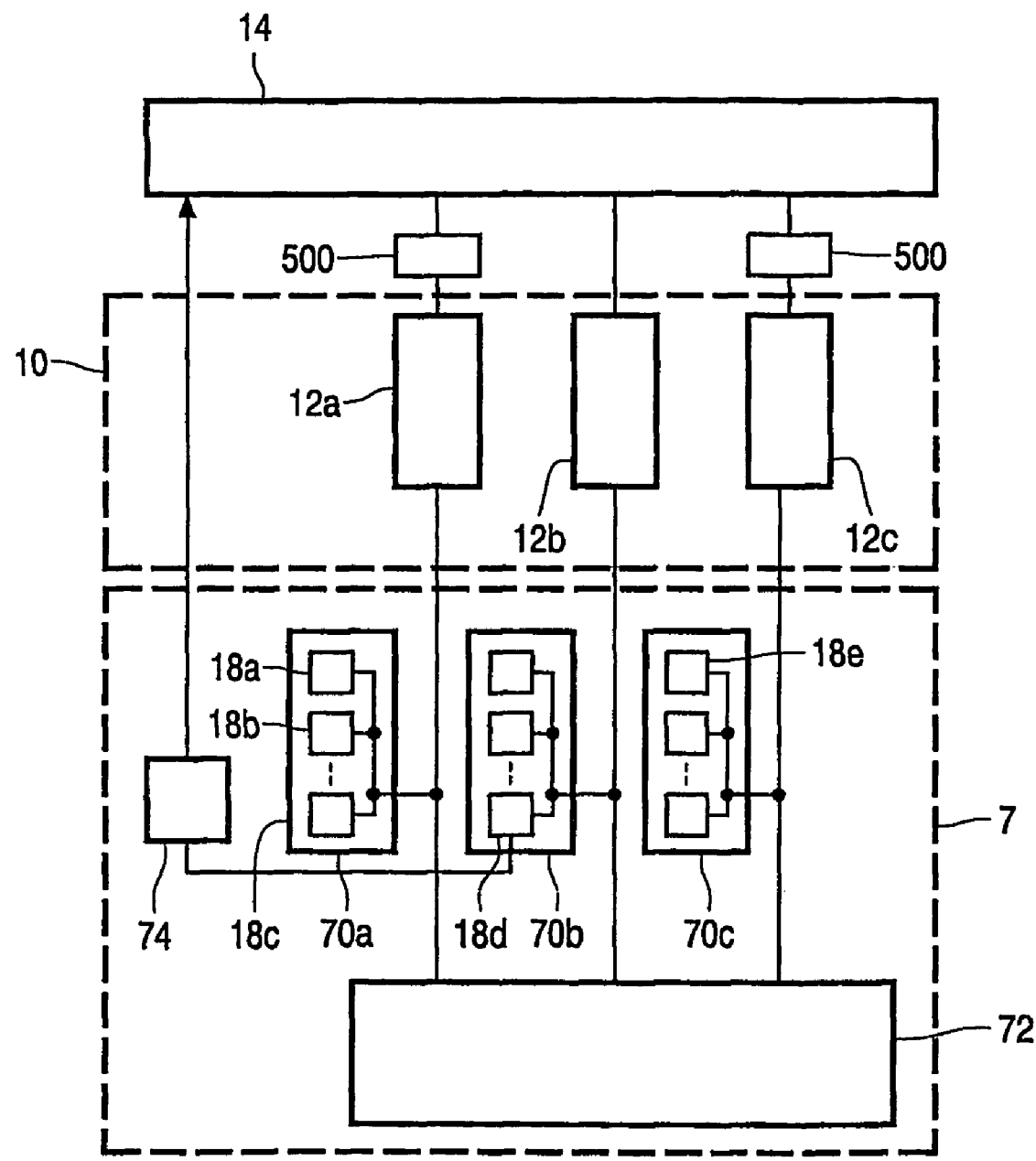
FIG. 5 shows a data processing apparatus

FIG. 5, for example, shows one or more memory management units 500 that are conventional per se, and which are used between the instruction address counter unit and some of memory units 12*a-c*, to provide for instruction address dependent translation (without deviating from the invention memory management units may be used for only one memory unit 12*a-c* or for all memory units 12*a-c*). In this case, the translation for different memory units may differ, so that a mutually different first and second instruction addresses are translated to the same physical address for part of the memory units, but to mutually different physical addresses for other memory units. In this way the examples that have been given above can be implemented without the need for modification update instructions in the program, by altering the address translation dependent on the common instruction address counter value. This instruction address counter (also called program counter) value runs on through successive iterations of loops that affect part of the functional units. From the value of the instruction address it can be determined whether a particular group of functional units 70*a* has to execute an instruction from a loop, and if needed even the iteration number can be determined. Accordingly, the memory management unit 500 repeatedly translates the instruction address for the relevant memory unit so as to repeatedly fetch the same instruction. It may be noted that in this case the modification of translation may even be detailed at the single instruction address level, so that a group 70*a-c* could execute instruction from the loop part of the time, while functional units from that same group 70*a-c* could execute progressive instructions the remainder of the time.

However, a program controlled offset register is less complex to implement than a memory management unit and has the advantage of supporting simple data dependent control, but for implementing loops with predetermined numbers of repetitions such memory management units work as well. Of course, without deviating from the invention other implementations may be used, such as offset counters, which periodically update the offset autonomously. Also combinations of offset registers and memory management units nay be used etc.

In practice the processing apparatus may use pipelining of instruction execution. That is, in the same instruction cycle controller 14 may process one instruction address, memory units 12*a-c* may retrieve instructions for a preceding instruction address and functional units 18*a-e* may process one or more processing stages for one or more yet further preceding instruction address. In this case, application of the offset from offset register 15*b* may also be pipelined.

The invention claimed is:

1. A data processing apparatus, the apparatus comprising: an instruction addressing unit; an instruction memory system arranged to output an instruction word, containing a plurality of instructions, in response to an instruction address from the instruction addressing unit, the instruction memory system comprising a plurality of memory units, arranged to output respective parts of the instruction word in parallel; an instruction execution unit, comprising a plurality of functional units, each capable of executing a respective instruction from the instruction word in parallel with execution of other instructions from the instruction word by other ones of the functional units; an instruction address modification circuit arranged to modify translation of the instruction address into a physical address for a particular one of the memory units relative to other ones of the memory units and to change generation of instruction words from instructions from different memory units during execution of a program, the instruction address modification circuit being configured to modify an address translation between supplying a first instruction address for a first instruction word and supplying a second instruction address for a second instruction word, the second instruction word being different from the first instruction word and including a copy of a part of the first instruction word, so that the part of the first instruction word is re-used in the second instruction word thereby reducing memory needed to store the program, wherein the instruction address modification circuit includes an offset register which is directly connected to an output of a functional unit of the plurality of functional units, the functional unit updating an offset value in the offset register during the execution of the program, and wherein the instruction address modification circuit is operationally coupled to a controller that provides the instruction address, and to one of the plurality of the functional units that provides an adjust signal to the instruction address modification circuit, and wherein the controller is distinct from the functional unit; the instruction address modification circuit being configured to modify the translation in response to the adjust signal and to provide a modified translated address to one of the plurality of the memory units.

2. The data processing apparatus according to claim 1, wherein the instruction address modification circuit is arranged to modify the translation under control of a modification update instruction from the instruction word during program execution.

3. The data processing apparatus according to claim 2, wherein the particular one of the memory units is arranged to supply instructions exclusively to a group that contains a subset of the functional units, the group containing a modification update functional unit constructed to execute the modification update instruction.

4. The data processing apparatus according to claim 2, wherein the particular one of the memory units is arranged to supply instructions exclusively to a group that contains a subset of the functional units, the functional units comprising a modification update functional unit outside the group constructed to execute the modification update instruction.

5. The data processing apparatus according to claim 2 wherein the modification update instruction is a conditional instruction, the modification update being executed dependent on fulfillment of a condition specified in the modification update instruction.

6. The data processing apparatus according to claim 1, wherein the instruction address modification circuit is arranged for instruction address and memory unit dependent address translation, so that a first and a second instruction address are translated to a same physical address for the particular one of the memory units and to mutually different physical addresses for one or more memory units other than the particular one of the memory units.

7. The data processing apparatus according to claim 1, programmed to use repeated modification of said translation to repeatedly output one or more instructions making up a loop of instructions, while the instruction address progresses so that the instructions from the loop are combined in the instruction words with progressive instructions that are not repeated during at least part of the repetitions of supply of instructions from the loop.

8. The data processing apparatus according to claim 2, programmed to use said modification update instruction to selectively output, dependent on a data dependent condition, a first or a second block of one or more instructions from said particular one of the memory units, while the instruction address progresses so that at least part of the memory units output one or more instructions from a third block of instructions as part of the instruction word or words in combination with instructions from said first or second block.

9. The data processing apparatus according to claim 1, wherein a first number of addressable instruction addresses of the particular one of the memory units differs from a second number of addressable instruction addresses of at least one of the memory units.

10. The data processing apparatus according to claim 9, wherein the particular one of the memory units is arranged to switch to a power saving state when the modified instruction address is outside an address range or set of address ranges that contains said first number of instruction addresses.

11. A method of executing a program of instruction words with a data processing apparatus that comprises a plurality of functional units that execute a plurality of instructions from each instruction word in parallel, wherein the instructions from each of at least some of the instruction words are fetched from respective memory units in parallel, the method comprising the acts of: addressing the instruction word with an instruction address that is common for the functional units, using a modifiable translation of the instruction address into a physical address for a particular one of the memory units to select dependent on program execution which instructions from the memory units will be combined into the instruction word in response to the instruction address; modifying an address translation between supplying a first instruction address for a first instruction word and supplying a second instruction address for a second instruction word, the second instruction word being different from the first instruction word and including a copy of a part of the first instruction word, so that a part of the first instruction word is re-used in the second instruction word thereby reducing memory needed to store the program; and connecting an output of an offset register to an offset adder, the offset adder being connected between a controller that provides the instruction address and the particular one of the memory units; wherein the modifying act includes updating, by a functional unit of the plurality of functional units, an offset value in the offset register during the execution of the program, the offset register being directly connected to an output of the functional unit, and the controller being distinct from the functional unit.

12. The method of executing a program of instruction words according to claim 11, wherein the modifiable translation is selected under control of a modification update instruction in the program.

13. The method of executing a program of instruction words according to claim 11, comprising modifiable translation to repeatedly fetch instructions from a loop from repeated physical addresses in a particular one of the memory units in response to progressive instruction addresses, so that the instructions from at least part of repetitions of the loop are combined in the instruction words with progressively different instructions memory units other the than the particular one of the memory unit.

14. The method of claim 11, wherein the modifying act is performed in response to an adjust output from one of the plurality of the functional units.

15. The data processing apparatus of claim 1, wherein an output of the offset register is connected to an offset adder, the offset adder being connected between the controller that provides the instruction address and the particular one of the memory units.

16. The data processing apparatus of claim 1, wherein the functional unit updates the offset value during the execution of the program dependent on conditions that occur during execution.

* * * * *